Feb. 13, 1940.   L. C. RUSKA   2,190,047
AUTOMOBILE GLASS CONTROL LOCK
Filed Oct. 28, 1937   2 Sheets-Sheet 1
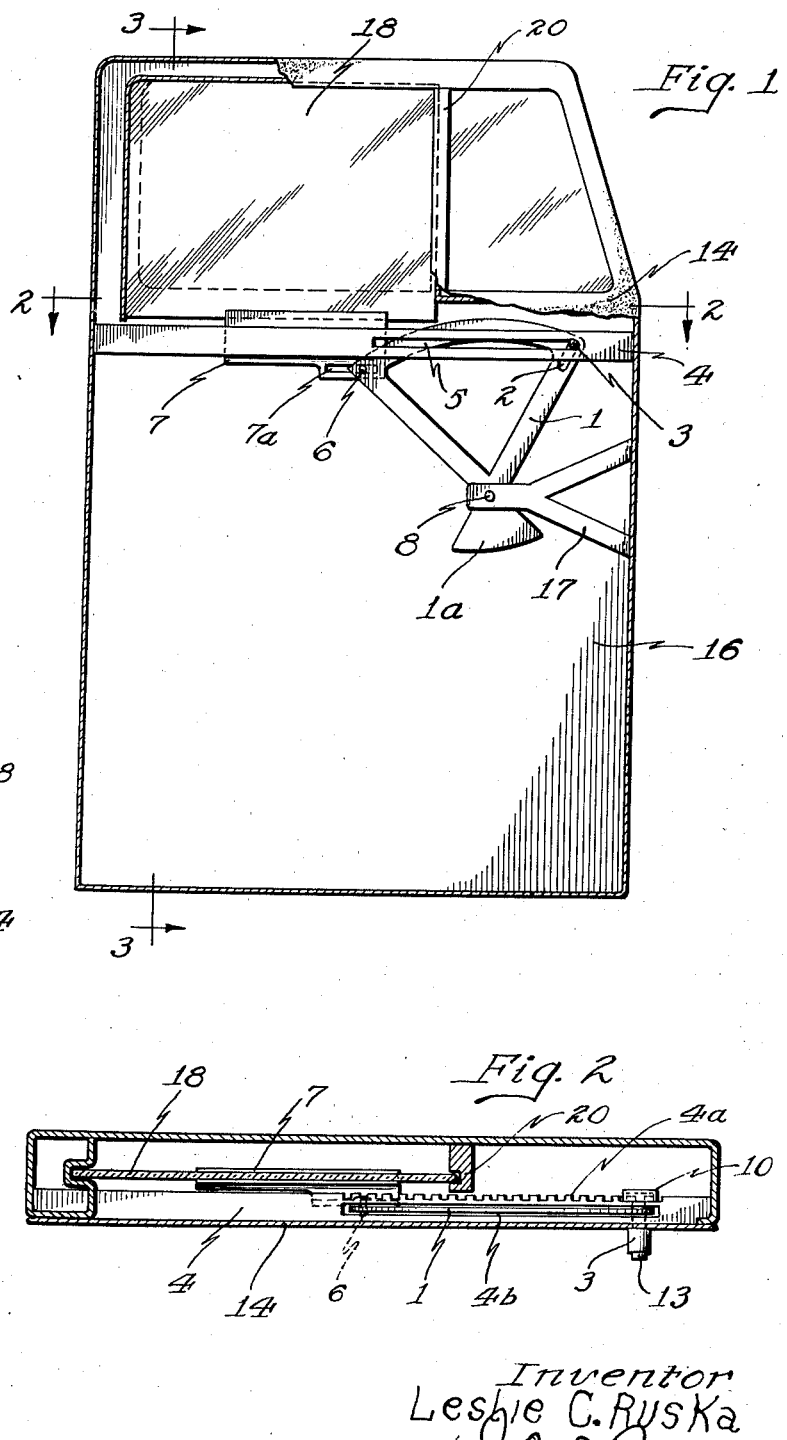
Inventor
Leslie C. Ruska
By: John F. Brezina Feb. 13, 1940.          L. C. RUSKA          2,190,047
AUTOMOBILE GLASS CONTROL LOCK
Filed Oct. 28, 1937          2 Sheets-Sheet 2
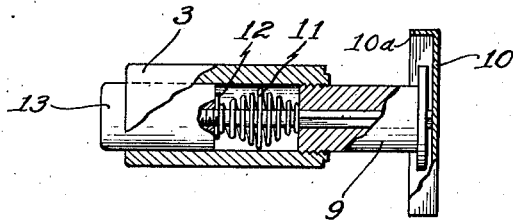
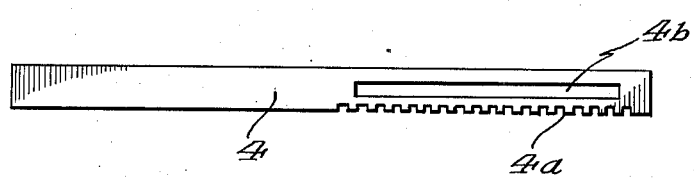
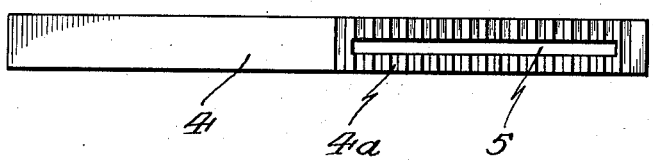
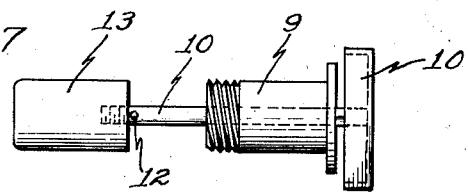
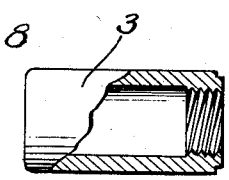
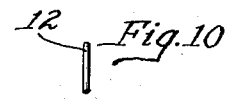
Inventor
Leslie C. Ruska
By:- John F Brezina Patented Feb. 13, 1940

2,190,047

UNITED STATES PATENT OFFICE 2,190,047

AUTOMOBILE GLASS CONTROL LOCK

Leslie C. Ruska, Cicero, Ill.

Application October 28, 1937, Serial No. 171,523

3 Claims. (Cl. 292—174)

This invention relates to a glass regulating and locking device adaptable to the present type of automobile body.

The principal object of this invention is to supply a manually operable locking device for controlling and positioning a slidable window glass of closed automobile bodies that will eliminate the present crank handle and all the gears necessary for its operation. This device and its system of operation offers a simpler construction and far greater ease of operation. It is also decidedly safer because it is impossible to operate this assembly with a wire or rod from outside the car as is possible with the crank system.

Fig. 1 is a side elevational view of the inside of a conventional automobile body door, with parts removed and certain parts broken away.

Fig. 2 is a cross sectional view taken on line II—II of Fig. 1.

Fig. 3 is a vertical cross sectional view taken on line III—III of Fig. 1 and showing the internal parts which operate to elevate the slidable pane.

Fig. 4 is an enlarged elevational view of the manually operable locking device, with parts broken away to show the interior thereof.

Fig. 5 is a top plan view of the cross bar of the door at the lower edge of the window opening.

Fig. 6 is a side elevational view of said cross bar.

Fig. 7 are enlarged views of the manually operable device shown in Fig. 4 and showing the respective parts disassembled.

Fig. 8 is a partially cross sectional view taken in side elevation of the cylindrical handle member shown assembled in Fig. 4.

Fig. 9 is a side elevational view of the spring within the depressible handle member shown in Fig. 4.

Fig. 10 is an edge elevational view of the washer mounted at the end of the depressible spring of Fig. 9.

Numeral 1 designates a metal triangular member having its upper side arcuate and having a counterweight 1a formed integral therewith. Said member 1 is pivoted by pivot 8 to the outer end of an anchoring bracket 11 which is preferably in the form of a yoke and is secured by welding or the like to the edge of the vehicle door.

Member 1 has a slot 2 therein at the juncture of the side edge and said arcuate edge, as clearly shown in Fig. 1. A portion of the control knob assembly, namely a flanged bushing member, hereinafter described, is adapted to slide in slot 2 as stated herein. Said member 1 is mounted to move in a vertical plane within the body door 16 and substantially parallel with its flat sides. A cross pin 6 is secured perpendicularly in the opposite upper corner of the member 1, as clearly shown in Figs. 1 and 2.

Numeral 4 represents a guide and cross bar which extends transversely of the door and defines the lower edge or "sill" of the window opening. This bar is preferably of substantially right-angled cross section or may also be formed integral with the metal plate from which the outer wall of the door is made. Fig. 5 shows this bar in top plan view and Fig. 6 in side elevation. Said bar has an elongated slot 4b in its upper and horizontally extending portion, as shown in Figs. 2 and 5. One of its lateral edges is serrated, as shown in Figs. 5 and 6, to form teeth 4a which extend transversely and horizontally. 5 represents an elongated slot in the vertical portion of bar 4, shown in Figs. 1 and 6. Triangular member 1 is so mounted that its upper portion moves within slot 4b, as clearly shown in top plan view in Fig. 2.

An elongated channeled offset glass-holding member 7 which is of U-shaped cross section and shown in Figs. 1 and 2, forms a supporting element and gripper for the slidable glass pane 18, the lower edge of the latter being suitably secured in said glass holding member 7. Said pane 18 is slidably mounted between grooved channel guide elements 19 and 20. The lower edge of said glass holding member has a longitudinally extending slot 7a therein, as shown in Fig. 1. Cross pin 6 extends into said slot 7a and rides therein during pivoting movement of member 1 and during vertical movement of the window pane, said pivoting movement of member 1 being transmitted through pin 6 into vertical movement of said pane.

The manually operable control knob assembly shown in enlarged form in Figs. 4 and 7 provides a releasable lock or fastening element for holding the slidable glass pane and the triangular member 1 in any one of a number of desired positions. Said locking and fastening unit comprises a metal cylindrical handle member 3 which is threaded internally at one end and has threaded therein the cylindrical end of a flanged bushing member 9. A catch-plate 10 comprising a stem and integral flat plate portion perpendicular to said stem is slidably mounted, as shown in Figs. 4 and 7, so that the stem thereof slides in the central aperture of bushing member 9 and extends through the chamber formed by the cylindrical handle member 3 and through the depressible coil spring 11. One end of coil spring 11 rests against the end of the threaded portion of bushing member 9. A pin 12 is secured in the stem of catch plate 10 to prevent the spring from coming off said stem when the remaining parts are assembled or disassembled. Said pin 12 is shown in Figs. 4 and 7. 10a designates the integral annular flange of catch plate 10 and which engages the teeth 4a of bar 4.

Reference numeral 13 designates a plug of cylindrical form and having a threaded aperture in one end into which is threaded the correspondingly threaded end of the stem of catch plate 10, said stem thereby fixedly connecting plug 13 and the outer flat plate portion of catch plate 10. It will be apparent that depression of the normally projecting portion of plug 13 will depress spring 11 and will move catch plate 10 to unseat and disengage the flange 10a from the recesses between the teeth 4a of bar 4, and that the projecting portion of the cylindrical handle member 3 will form a handle or grip which the user will normally hold in the palm of the hand and simultaneously depress the plug 13 with the thumb. During such gripping action the user may either pull or push said handle either in a direction forward or rearward of the vehicle and door and thereby either raise or lower the slidable pane through the pivoting movement of triangular member 1 as before described. Due to the number of serrations forming teeth 4a, the user may lock the slidable pane in any desired position at any desired height.

It is evident that by releasing catch plate 10 from the grooves of member 4 by pressing plug 13 and sliding handle member 3 back and forth in its slot, said section will rock on its pivot 8, thereby raising or lowering pin 6 which will operate to move the glass to any desired level, releasing plunger 13 will lock the device in any desired position due to action of spring 11.

What is claimed is:

1. In a releasable locking means for slidable windows of automobile doors, a guide and cross bar having a horizontal slot therein and having a plurality of teeth along one edge thereof; a hollow handle member having a bushing portion slidably mounted in said horizontal slot of said bar, said handle member having a passage therethrough; a catch plate having an annular peripheral flange adapted to engage said teeth on said bar, a stem connecting said catch plate and extending through said bushing member and said handle member and slidably mounted therein, and a spring on said stem for normally holding said catch plate in locked position, the manual depression of said stem being adapted to release said catch plate to permit sliding movement of said locking device.

2. In a releasable locking means for slidable windows of automobile doors, a guide and cross bar having a horizontal slot therein and having a plurality of teeth along one edge thereof; a hollow handle member having a bushing portion slidably mounted in said horizontal slot of said bar, said handle member having a passage therethrough; a flanged catch plate, said flange being adapted to engage said teeth on said bar, a stem connected to said catch plate and extending through said bushing member and slidably mounted in said handle member, a spring on said stem for normally holding said catch plate in locked position, a slidable plug in said handle member and connected to said stem, the manual depression of said plug being adapted to release said catch plate to permit sliding movement of said locking device.

3. In a releasable locking device for locking slidable windows or the like, a toothed guide bar having a longitudinal slot therein; handle means comprising a pair of hollow cylindrical members threadingly connected together and in alignment, one of said members having an annular perpendicularly extending flange and being slidably mounted in said slot, a retractable element slidably mounted in said handle means comprising a plunger and connected stem; a catch plate on the end of said stem adapted to releasably engage said teeth of said guide bar to lock said handle member against sliding movement; and a spring in said handle means for normally retracting said retractable element to cause engagement of said catch plate.

LESLIE C. RUSKA.